United States Patent [19]

Durnil

[11] Patent Number: 5,404,996
[45] Date of Patent: *Apr. 11, 1995

[54] VIBRATORY DRIVE SYSTEM FOR A VIBRATORY CONVEYOR APPARATUS AND A CONVEYOR APPARATUS HAVING SAME

[75] Inventor: Michael W. Durnil, Louisville, Ky.

[73] Assignee: Carrier Vibrating Equipment, Inc., Louisville, Ky.

[*] Notice: The portion of the term of this patent subsequent to Aug. 11, 2010, has been disclaimed.

[21] Appl. No.: 902,816

[22] Filed: Jun. 23, 1992

[51] Int. Cl.⁶ .................................. B65G 27/32
[52] U.S. Cl. ................................ 198/761; 198/766
[58] Field of Search ..................... 198/761, 766, 762

[56] References Cited

U.S. PATENT DOCUMENTS

| | | | |
|---|---|---|---|
| 2,705,070 | 3/1955 | Carrier, Jr. et al. | 198/761 X |
| 4,019,626 | 4/1977 | Kammer | 198/766 X |
| 4,088,223 | 5/1978 | Bertrand | 198/766 X |
| 4,174,032 | 11/1979 | Watkins | 198/761 |
| 4,520,920 | 6/1985 | Ray | 198/766 X |
| 4,807,487 | 2/1989 | Seidl | 198/766 X |

FOREIGN PATENT DOCUMENTS

| | | | |
|---|---|---|---|
| 483868 | 10/1929 | Germany | 198/761 |
| 2902263 | 7/1980 | Germany | 198/766 |
| 0923927 | 4/1982 | U.S.S.R. | 198/766 |
| 0967910 | 10/1982 | U.S.S.R. | 198/766 |
| 1541154 | 2/1990 | U.S.S.R. | 198/766 |

*Primary Examiner*—D. Glenn Dayoan
*Attorney, Agent, or Firm*—Camoriano & Smith

[57] ABSTRACT

A vibratory drive system for a vibratory conveyor apparatus is operable to selectively vary the displacement of the drive system between zero and a maximum displacement while the drive system is operating imparting a vibratory conveying force to the conveyor apparatus. A vibratory conveyor apparatus having a vibratory drive system operable to vary the displacement of the drive system and, therefore, the displacement imparted to the vibratory apparatus between zero and a maximum displacement, while the drive system is operating imparting a conveying force to the conveyor apparatus.

13 Claims, 10 Drawing Sheets

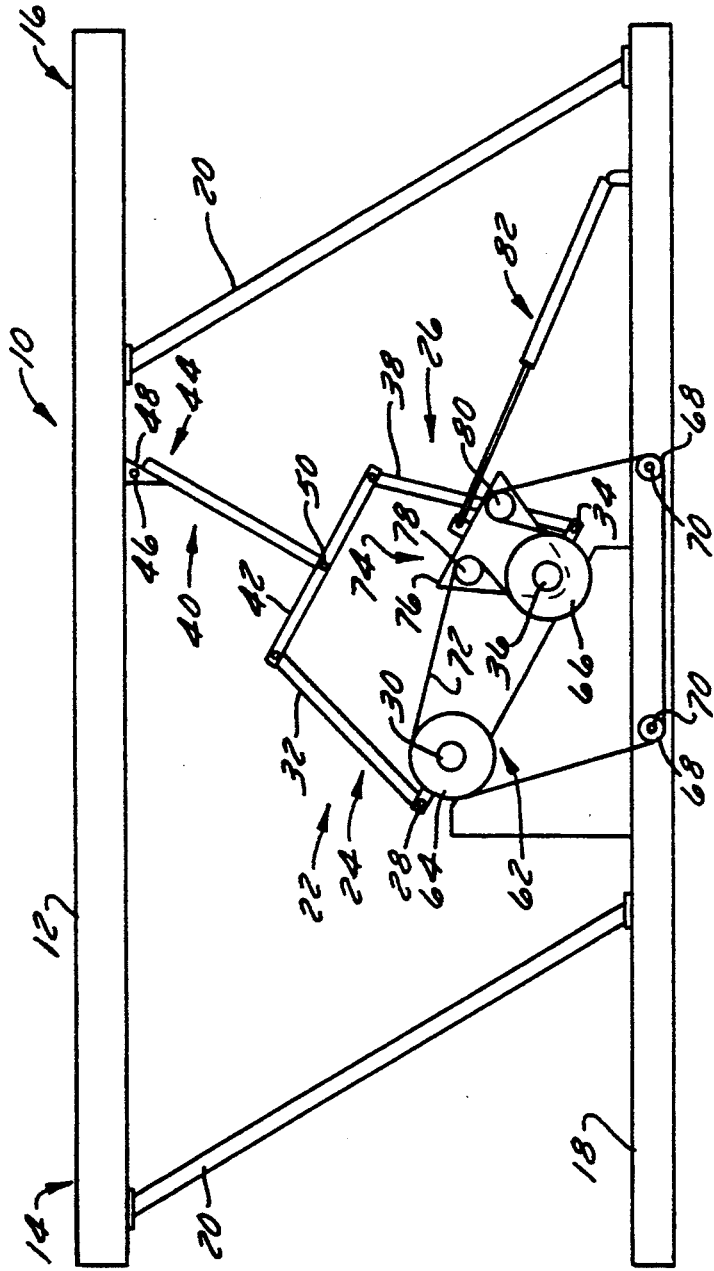
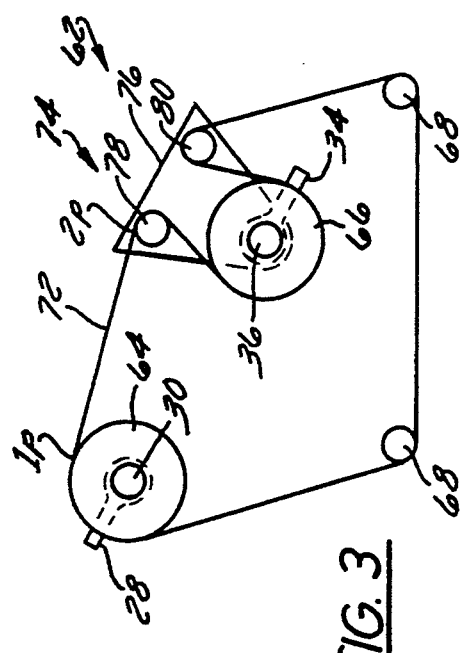
FIG. 2
FIG. 3

VIBRATORY DRIVE SYSTEM FOR A VIBRATORY CONVEYOR APPARATUS AND A CONVEYOR APPARATUS HAVING SAME

BACKGROUND OF THE INVENTION

The present invention relates to vibratory conveyor apparatus, and more particularly to a vibratory drive system for a vibratory conveyor apparatus utilizing a pair of rotating eccentric crank devices to impart a displacement to the conveyor apparatus and a conveyor apparatus having the drive system.

Eccentric crank drive systems for providing linear force generation to vibratory conveyor apparatus are known per se. These known eccentric crank drive systems typically utilize a single rotating eccentric crank mounted to, for example, the conveyor frame and connected to a conveying trough of the conveyor apparatus to impart a predetermined displacement to the conveying trough. The eccentric crank imposes a fixed peak-to-peak displacement through an elastomer connection to the conveying trough, thereby, exciting or transferring a vibratory motion to the conveyor trough. The peak-to-peak displacement provided by these known eccentric crank drive systems is fixed, that is they cannot be varied, without removing the eccentric crank drive and replacing it with another eccentric crank drive of a different stroke.

These known eccentric crank drive systems do not provide for selectively changing the effective crank eccentric stroke of the eccentric crank drive system and, therefore, varying the stroke of the vibration motion of the conveying trough of the conveying apparatus to suit different conveying conditions.

SUMMARY OF THE INVENTION

The present invention provides an eccentric crank drive system for vibratory conveyor apparatus which furnishes versatile operation of an eccentric crank drive system and a vibratory conveyor apparatus having an eccentric drive system heretofore unknown.

The present invention also provides an eccentric crank drive system for vibratory conveyor apparatus for selectively infinitely adjusting the conveying capacity in a range between zero, or stand-still, and a maximum without having to change the eccentric crank for another of a different stroke.

The present invention still further provides an eccentric crank drive system of the class described for selectively changing the effective crank eccentric stroke of the drive system without having to change the eccentric crank for another of a different stroke.

The present invention even further provides an eccentric crank drive system of the class described for selectively changing the effective crank eccentric stroke of the drive system even while the drive system is operating.

More particularly, the present invention provides an eccentric crank drive system for a vibratory conveyor apparatus for selectively infinitely adjusting the stroke of the drive system between zero and a maximum, while the drive system is operating comprising two eccentric crank devices in tandem relationship with each other for rotation about parallel axes, attachment means for attaching the eccentric crank devices to the conveyor apparatus to impart a resulting displacement to the conveyor apparatus, drive means for rotating the eccentric crank devices about their respective axis of rotation in opposite directions, and phase angle adjustment means operatively associated with the drive means for selectively varying the relative phase angle between the two eccentric crank devices.

The present invention also provides a vibratory conveyor apparatus comprising a frame, a conveying trough disposed over the frame, and an eccentric crank drive system comprising two eccentric crank devices mounted to the frame in tandem relationship for rotation about parallel axes, attachment means for attaching the eccentric crank devices to the conveying trough to impart a resulting displacement to the conveying trough, drive means for rotating the eccentric crank devices about their respective axis of rotation in opposite directions, and phase angle adjustment means operatively associated with the drive means for selectively varying the relative phase angle between the two eccentric crank devices.

BRIEF DESCRIPTION OF THE DRAWINGS

A better understanding of the present invention will be had upon reference to the following discussion in conjunction with the drawings, wherein like numerals refer to like parts through the several views and in which:

FIG. 2 is a schematic left side view of the vibratory conveyor apparatus of FIG. 1;

FIG. 3 is an enlarged schematic side view of the drive system of the present invention;

DETAILED DESCRIPTION OF THE PREFERRED EMBODIMENTS

Figure 1:
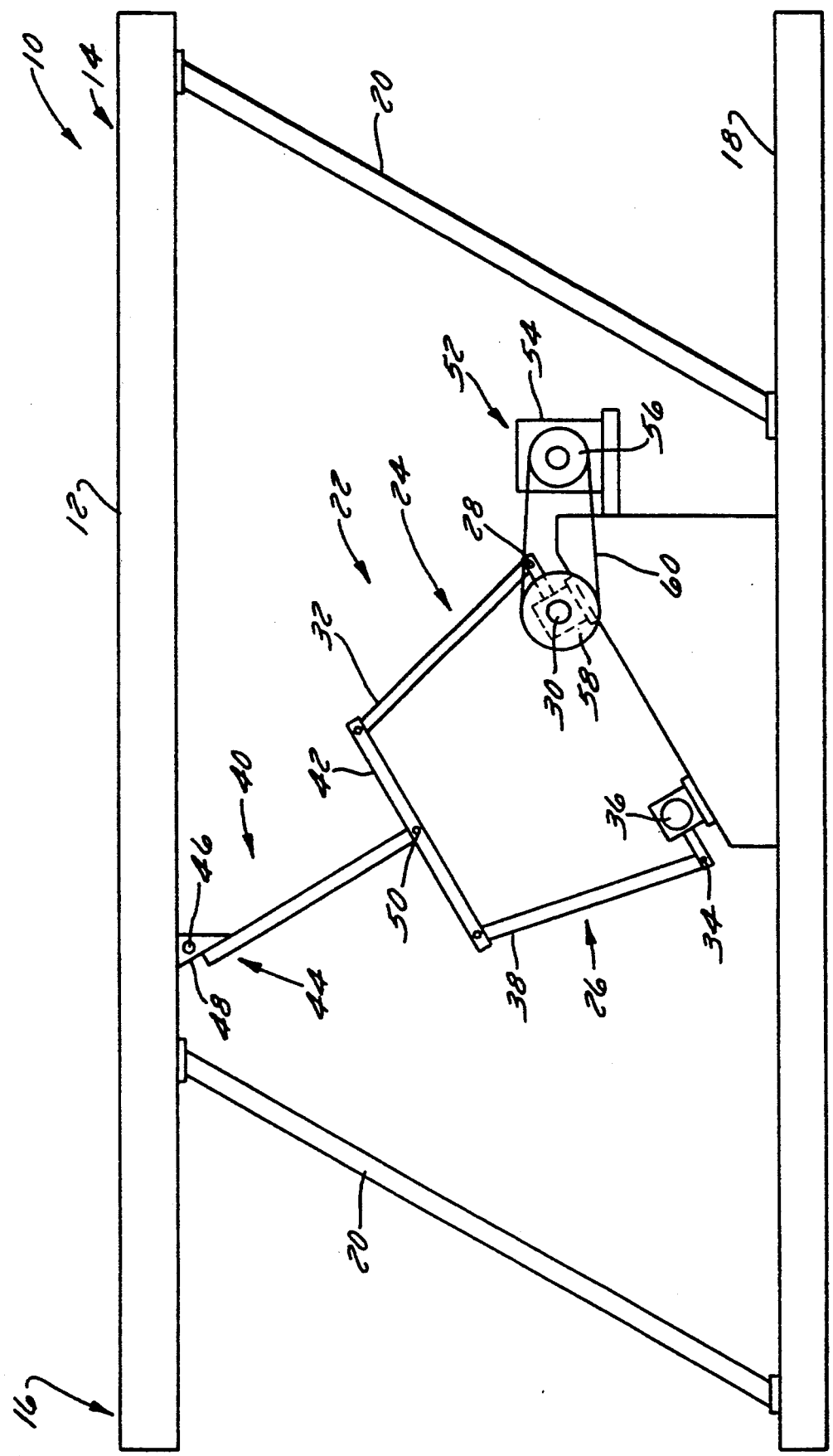
FIG. 1 is a schematic right side view of a typical vibratory conveyor apparatus of a known type having the vibratory drive system of the present invention.

With reference to FIG. 1, there is shown a conventional vibratory conveyor apparatus, generally denoted as the numeral 10. Typically, such conventional vibratory conveyor apparatus 10 includes a conveying deck or trough 12 along with material is conveyed from the inlet end 14 to the outlet end 16. Usually, such vibratory conveyor apparatus 10 includes a conveying deck support frame 18. The conveyor deck 12 is located above or below the support frame 18 such that the conveyor deck 12 is either supported above or suspended from the support frame 18. For the sake of brevity of description of the present invention, the conveyor deck 12 is shown as being located above the support frame 18, it being clearly understood that the present invention to be hereinafter described can be used with equal versatility with a conveyor apparatus having the conveying deck 12 suspended from the support frame 18. As shown, the conveying deck 12 is supported above and is interconnected to the support frame 18 by isolation means 20, such as, for example, coil springs, resilient pads, leaf springs, and the like, in a manner well known in the art of vibratory conveyor apparatus.

It should further be clearly understood at this point, that the present invention can be used with vibratory conveyor apparatus of virtually any design, and for the reason that the conveyor apparatus, per se, does not comprise a part of the present invention, for the sake of brevity, the conveyor apparatus will not be further described.

With continued reference to FIG. 1, and in addition to FIGS. 2 and 3, there is shown an eccentric crank vibratory drive system generally denoted as the numeral 22 for a vibratory conveyor apparatus, such as the conveyor apparatus 10, operatively connected to the conveying deck 12 of the conveyor apparatus 10 which provides for selectively infinitely adjusting the conveying stroke imparted to the conveying trough 12 from zero, or stand-still, to a maximum even while the drive system 22 is operating.

As can be best seen in FIGS. 1, 2, and 3, the vibratory drive system 22 of the present invention comprises two eccentric crank means, such as a first crank device 24 and a second crank means 26. The first and second crank means 24 and 26 are mounted to the conveyor support frame 18 in tandem relationship to each other and for rotation about parallel axes. The first crank means 24 is shown as a crank arm or bell-crank 28 attached at its proximal end to a first horizontal axle 30 transverse to the conveying direction and mounted to the conveyor frame 18 by appropriate bearings, and a connecting rod 32 attached at its first or one of its ends to the distal end of the crank arm or bell crank 28. The second crank means 26 is shown as a crank arm or bell crank 34 attached at its proximal end to a second horizonal axle 36 transverse to the conveying direction and mounted to the conveyor frame 18 by appropriate bearings, and a connecting rod 38 attached at its first or one of its end to the distal end of the crank arm or bell crank 34. Therefore, the axles 30 and 36 are spaced apart and parallel to each other and define the axis of rotation of the crank arms 28 and 34, respectively. The connecting rods 32 and 38 are attached to the conveying trough 12 by attachment means, generally denoted as the numeral 40, to impart a resulting displacement to the conveying trough 12. The attachment means 40 is a link 42 pivotally attached at one of its ends to the second or other end of the connecting rod 32, pivotally attached at the other one of its ends to the second or other end of the connecting rod 38, and pivotally attached between its ends to the conveying trough 12 by pivot drive connection means, generally denoted by the numeral 44. The pivot drive connection means 44 can be, for example, a horizontal transverse axle 46 attached to the conveying trough 12 by a mounting plate 48. The axle 46 is received in an appropriate bearing 50 located at the midpoint of the link 42. The crank arms 28 and 34 are attached to their respective axles 30 and 36 at relative phase angles "a" to each other measured from a datum such as, for example, an imaginary horizontal line "b". As the eccentric crank arms 28 and 34 rotate, they cooperate with the connecting rods 32 and 38, respectively, to generate a resultant displacement imparted to the conveyor deck 12 through the pivotally-mounted link 42.

The vibratory drive system 22 of the conveyor apparatus 10 further includes drive means, generally denoted as the numeral 52, for rotating the crank arm 28 of the first crank device 24 about the axis defined by the axle 30 and the crank arm 34 of the second crank device 26 about the axis defined by the axle 36. The drive means 52 includes a drive motor 54 mounted on the support frame 18 adjacent the first crank device 24 and includes a driver pulley 56 on its output shaft, a driven pulley 58 attached on the axle 30 of the first crank device 24, and a drive belt 60 looped or trained about the driver pulley 56 and the driven pulley 58. The drive means 52 further includes interconnecting means, generally denoted as the numeral 62 drivingly interconnecting the first crank means 24 and the second crank means 26. The interconnecting means 62 includes a first sheave 64 mounted to the axle 30 of the first crank means 24, a second sheave 66 mounted to the axle 36 of the second crank means 26, a tensioning sheave 68 mounted on a stub axle 70 which is rotatably attached to the support frame 18 adjacent the axle 36 of the second crank means 26, and a driven belt 72. The tensioning sheave 68 is selectively movable upwardly and downwardly to maintain a desired tension on the driven belt 72 as may be required to keep it properly tracking on the first sheave 64 and second sheave 66 of the interconnecting means 62. This can be accomplished in various ways, such as, for example using a standard, known spring-loaded tensioning pulley. The drive belt 72 is disposed relative to the first sheave 64 and the tensioning sheave 68 with its inside surface in contact with these sheaves, and relative to the second sheave 66 with its outside surface in contact therewith. Therefore, the axle 30 and crank arm 28 of the first crank means 24 will be rotated in a first direction, for example clockwise as seen in FIGS. 3–19, by the motor 54 and the axle 36 and crank arm 34 of the second crank means 26 will be rotated in a second direction opposite to the first direction, for example counterclockwise.

With reference to FIGS. 1 and 3, there is shown displacement adjustment means such as phase angle adjustment means, generally denoted as the numeral 74, operatively associated with the drive means 52, and more particularly the interconnecting means 62, for selectively varying the relative phase angle "a" between the crank arm 28 of the first crank device 24 and the crank arm 34 of the second crank device 26. The phase angle adjustment means 74 is shown as comprising a phase angle adjustment plate 76 journal mounted on the horizontal axle 36 of the second crank device 26 for rotation through an arc relative to and centered on the axle 36. The adjustment plate 76 includes first and second idler sheaves 78 and 80, respectively, mounted thereto for rotation and located to either side of and generally above the horizontal axle 36 of the second crank device 26 with their axes of rotation parallel to each other and parallel to the horizontal axle 36. The driven belt 72 is also trained about the idler sheaves 78 and 80. The driven belt 72 is disposed relative to the first sheave 64 of the first crank device 24, the tensioning sheave 68 and the two idler sheaves 78 and 80 on the phase angle adjustment plate 76 with its inside surface in contact with these sheaves, and relative to the second sheave 66 of the second crank device 26 with its outside surface in contact therewith, so that the driven belt 72 follows a serpentine path.

With continued reference to FIGS. 1 and 3, the phase angle adjustment plate 76 is caused to selectively move through an arc centered on the horizontal axle 36 of the second crank device 26 by adjustment plate moving means, generally denoted as the numeral 82. As shown, the adjustment plate moving means 82 includes, for example, a hydraulically-operated ball screw actuator device or hydraulic cylinder actuator device having the hydraulic cylinder pivotally attached to the support frame 18 and the end of the operating rod pivotally attached to the adjustment plate 76 such that when the operating rod of the actuator device is extended, it coacts with the adjustment plate 76 to push the adjustment plate 76 in, for example a counter-clockwise arcuate motion centered on the horizontal axle 36 of the second crank device 26, and when the operating rod of the actuator device is retracted, it coacts with the adjustment plate 76 to pull the adjustment plate 76 in, for example a clockwise arcuate motion centered on the horizontal axle 36 of the second crank device 26. While the adjustment plate moving means 82 is illustrated as being a hydraulically actuated ball screw or hydraulic cylinder device, it should be clearly understood that various other conventional or otherwise convenient devices can be used instead. Various such other devices include, for example, a motor-driven clutch device, manually operated threaded rod device, and the like.

Figure 4:
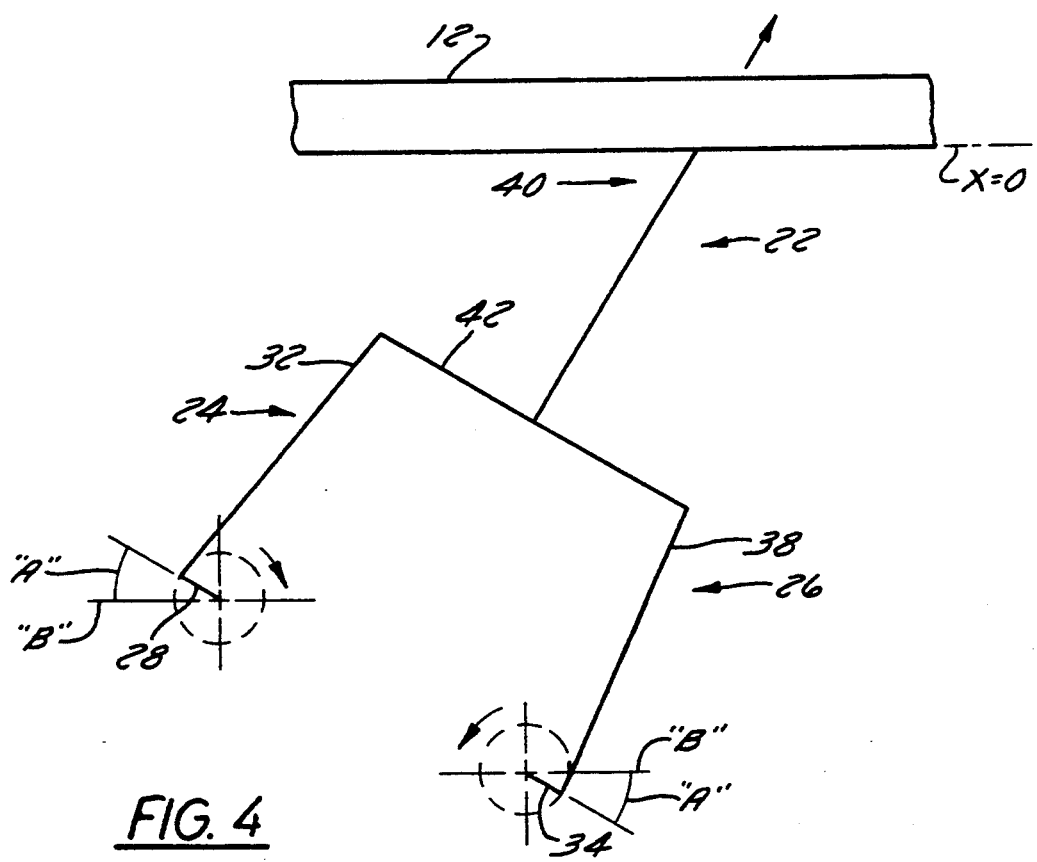
FIG. 4 schematically represents the drive system of the present invention in an initial operative position.
Figure 8:
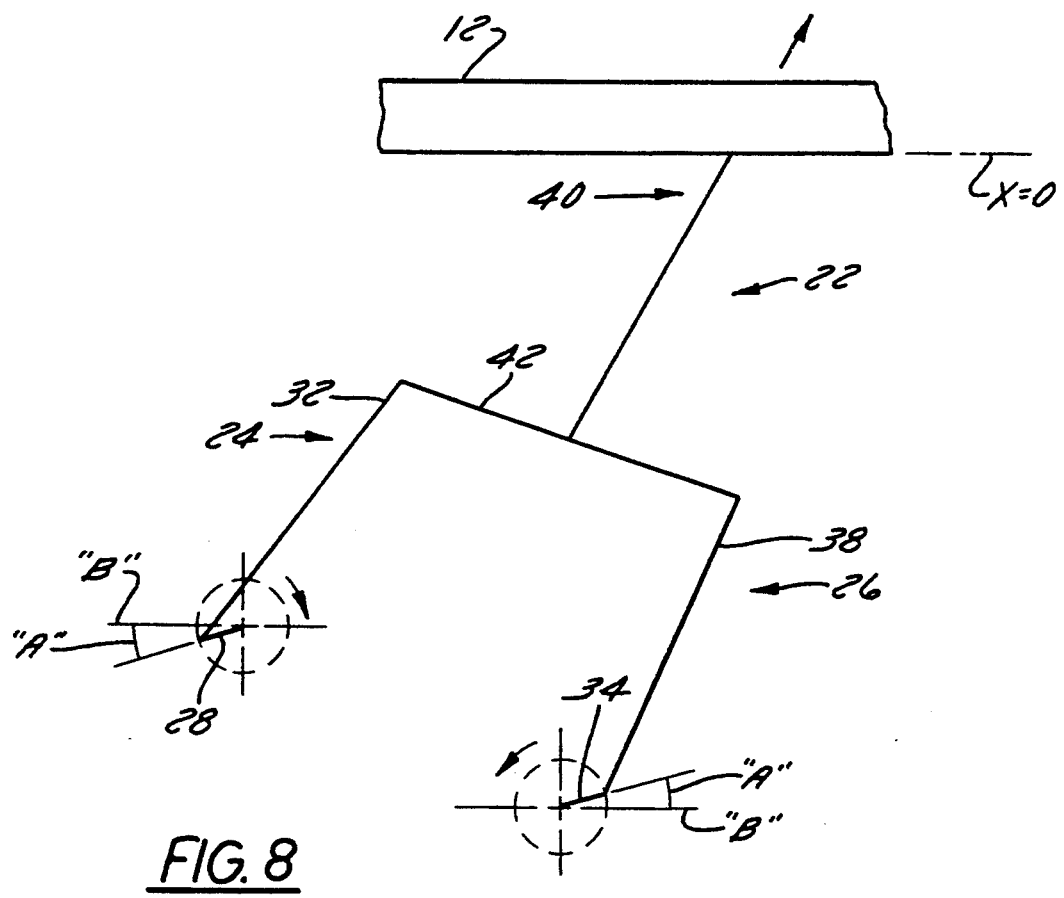
FIG. 8 schematically represents the drive system of the present invention in an adjusted first operative position.
Figure 16:
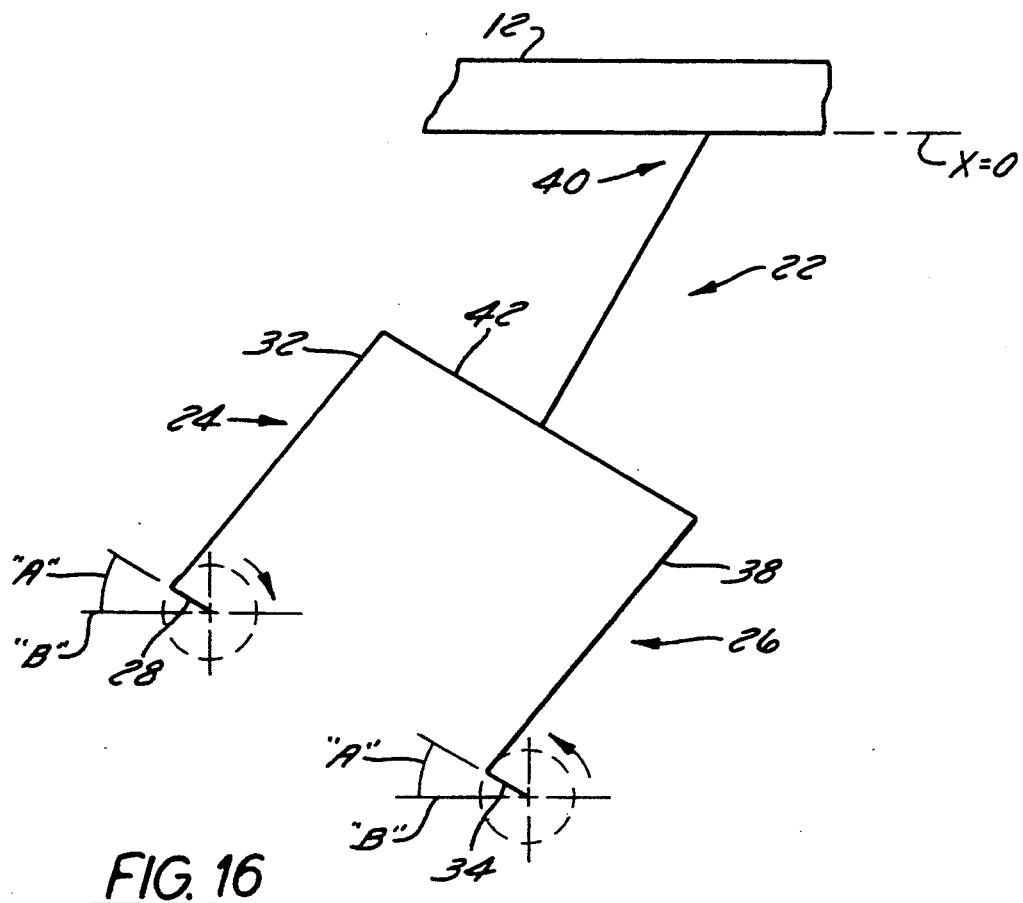
FIG. 16 schematically represents the drive system of the present invention in an adjusted second operative position from the adjusted first operative position.

With reference to FIGS. 4, 8, and 16, there is shown in schematic format, the effects of the above-described movements of the phase angle adjustment means 74 on the phase angle "a" of the crank arms 28 and 34. FIG. 4 shows the initial rotational position or phase angles "a" relationships of the crank arm 28 relative to the crank arm 34 with (and corresponding to) the phase angle adjustment means 74 in an initial or neutral position. FIG. 8 shows the first rotational position or phase angles "a" relationships of the crank arm 28 relative to the crank arm 34 with (and corresponding to) the phase angle adjustment means 74 in a first arcuately-displaced position wherein the adjustment plate 76 has been moved, for example, in a counter-clockwise direction from the initial position. FIG. 16 shows the second rotational position or phase angles "a" relationships of the crank arm 28 relative to the crank arm 34 with (and corresponding to) the phase angle adjustment means 74 in a second arcuately-displaced position, wherein the adjustment plate 76 has been further moved in a counter-clockwise direction from the first arcuately-displaced position.

As the crank arm 28 rotates with the axle 30 in one rotational direction and as the crank arm 34 rotates with the axle 36 in the opposite rotational direction, the crank arms 28 and 34 each produce a linear displacement at a selected phase angle "a", relative to, for example the imaginary datum line "b", through the connecting rods 32 and 38, respectively, on the link 42 of the attachment means 40 which imparts a linear resultant displacement to the conveying deck or trough 12.

FIGS. 4 through 7, sequentially illustrate the operation of the drive system 22 and its displacement effects on the trough 12 with the crank arm 28 and the crank arm 34 in an initial rotational position or phase angles "a" relationship (corresponding to an initial or neutral position of the phase angle adjustment plate 76) as the crank arms 28 and 34 rotate on the axles 30 and 36, respectively. As seen in FIG. 4, at a time equal to zero, the crank arm or bell crank 28 of the first crank device 24 is at an initial phase angle of 30° to the datum "b" in the second quadrant of rotation (or 150° in the second quadrant), and the crank arm or bell crank 34 of the second crank device 26 is at an initial phase angle of 30° to the datum "b" in the fourth quadrant of rotation (or 330° in the fourth quadrant). At this time (time equal to zero), the trough 12 is at a resultant displacement "x" of zero as indicated by the phantom displacement datum x=o.

Figure 5:
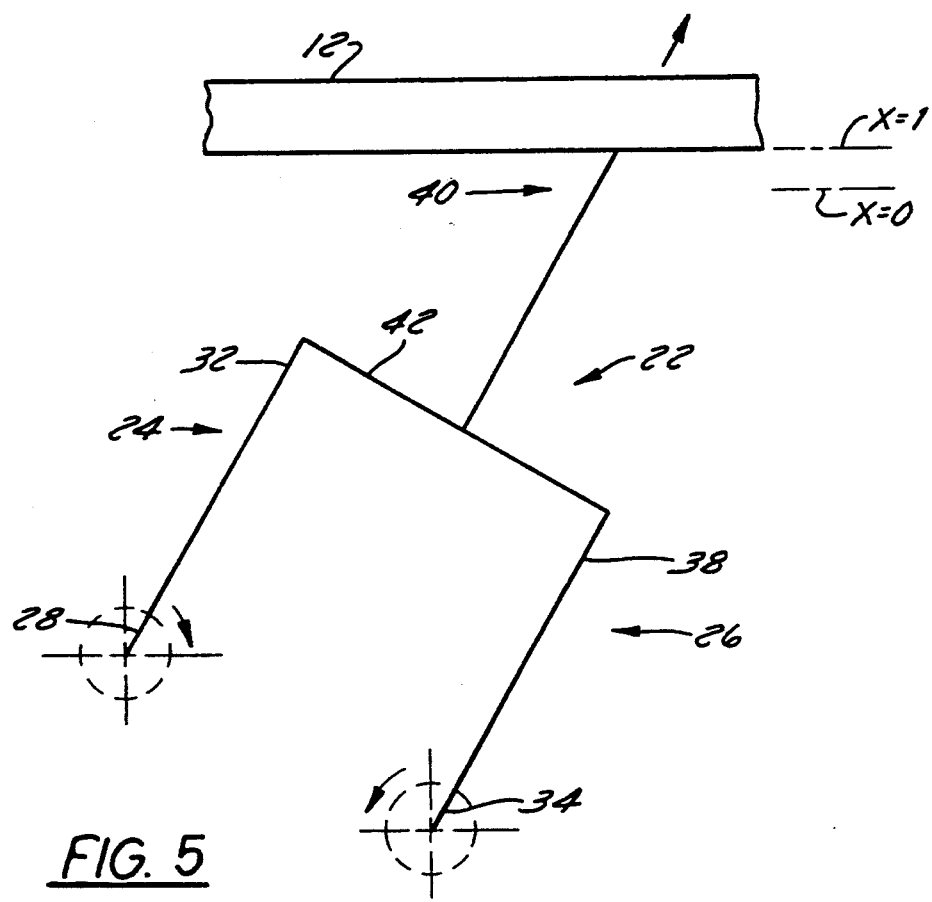
FIGS. 5-7 schematically sequentially illustrate the operation of the drive system as it functions in the initial position of FIG. 4.
Figure 6:
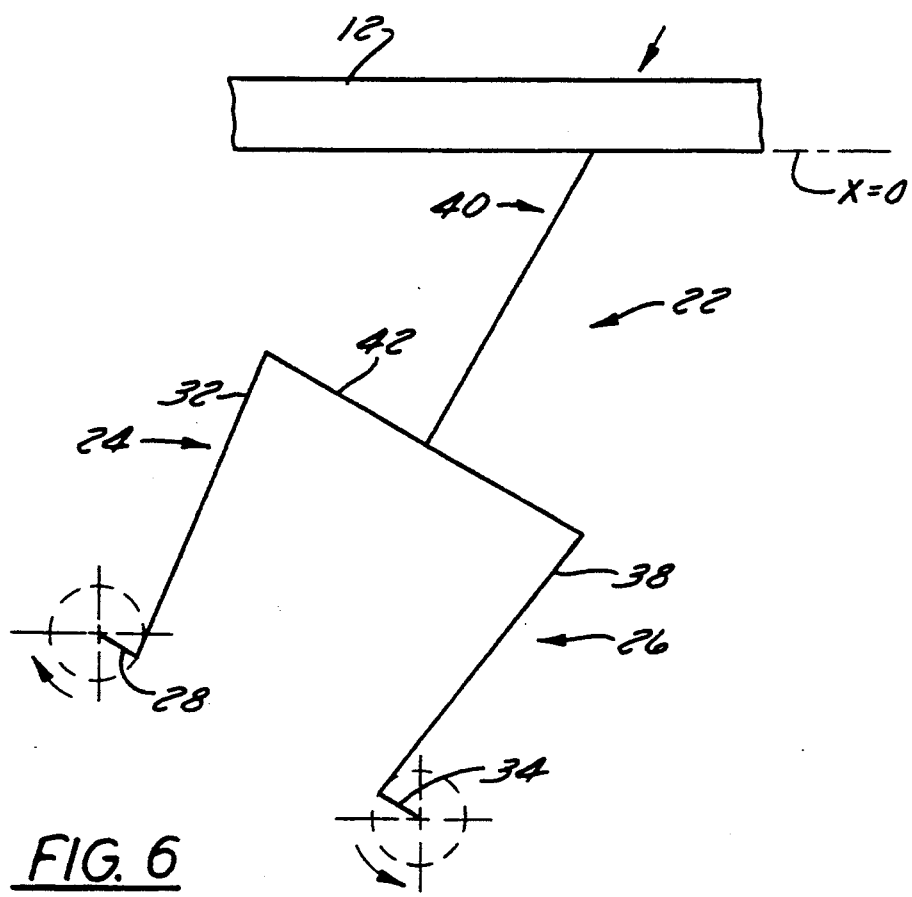
Figure 7:
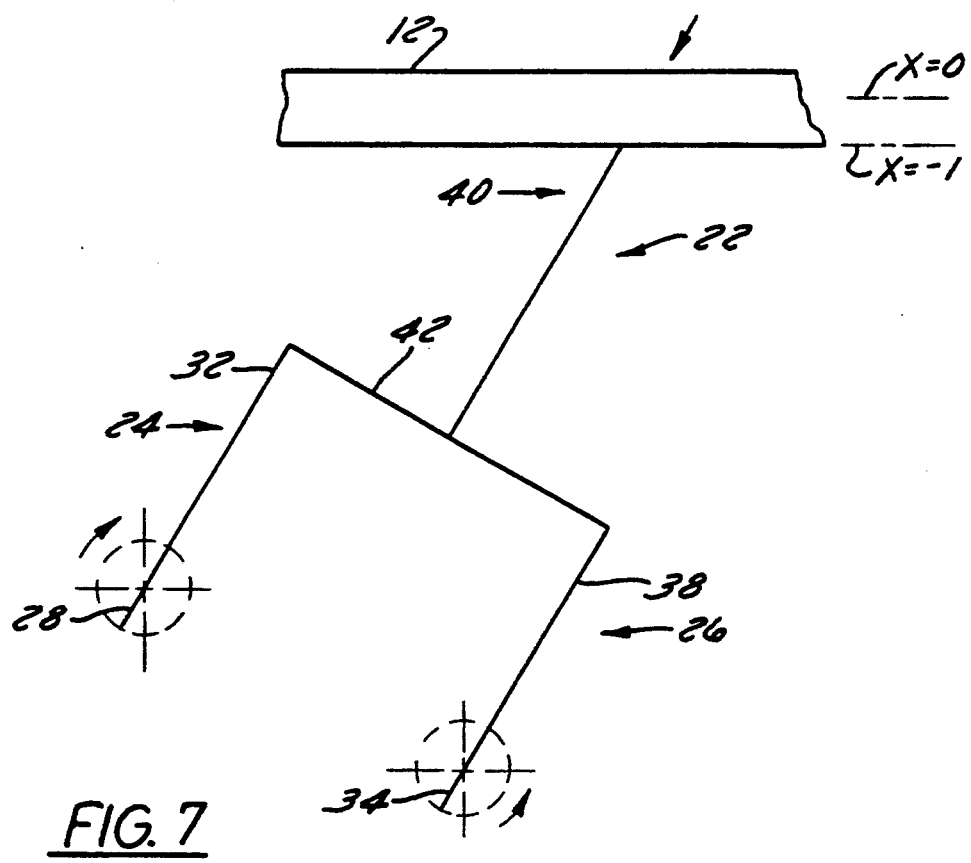

As can be seen in FIG. 5, at a time equal to $\pi/4$, or 90° of rotation from the time equal to zero, the crank arm 28 of the first crank device 24 has rotated clockwise to an angle of 60° in the first quadrant and the crank arm 34 of the second crank device 26 has rotated counter-clockwise to an angle of 60° in the first quadrant. At this time (time equal to $\pi/2$), the trough 12 has moved generally upwardly to a maximum resultant upward displacement as indicated by the phantom displacement line X=1 (equal to the throw of each of the crank arms 28, 34). As can be seen in FIG. 6, at a time equal to $\pi$ or 180° of rotation from the time equal to zero, the crank arm 28 of the first crank device 24 has rotated clockwise to an angle of 330° in the fourth quadrant and the crank arm 34 of the second crank device 26 has rotated counter-clockwise to an angle of 150° in the second quadrant. At this time (time equal to $\pi$), the trough 12 has moved generally downwardly back to a resultant displacement "x" of zero. As can be seen in FIG. 7, at a time equal to $3/2\pi$ or 270° of rotation from the time equal to zero, the crank arm 28 of the first crank device 24 has rotated clockwise to an angle of 240° in the third quadrant and the crank arm 34 of the second crank device 26 has rotated counter-clockwise to an angle of 240° in the third quadrant. At this time (time equal to $3/2\pi$), the trough 12 has moved generally downwardly to a maximum resultant downward displacement as indicated by the phantom displacement line x=−1 (equal to the throw of each of the crank arms 28, 34).

Figure 9:
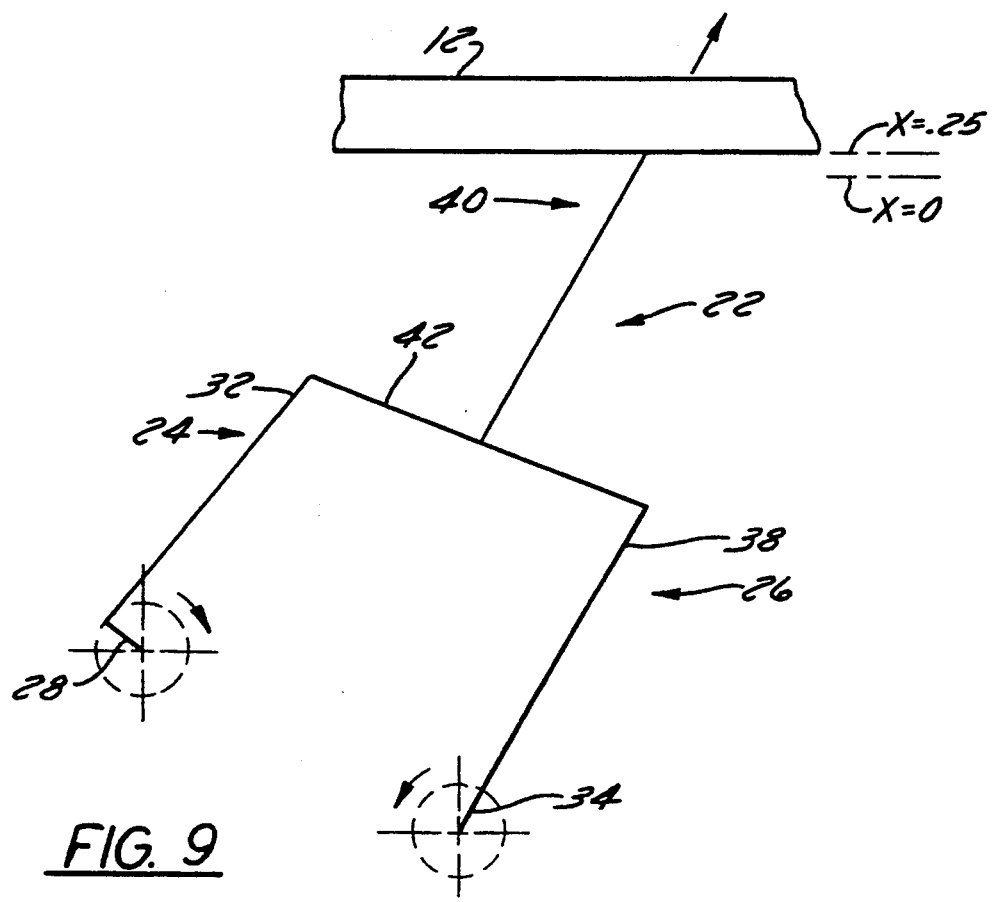
FIG. 9-15 schematically sequentially illustrate the operation of the drive system as it functions in the adjusted first operative position.
Figure 10:
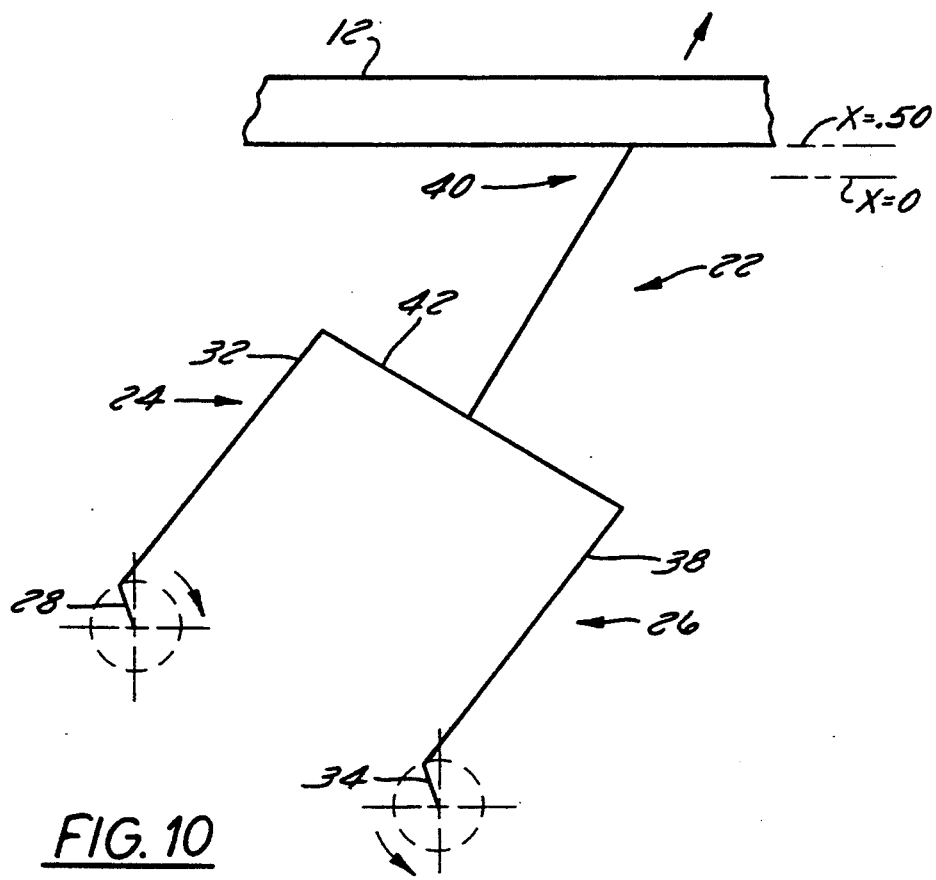
Figure 11:
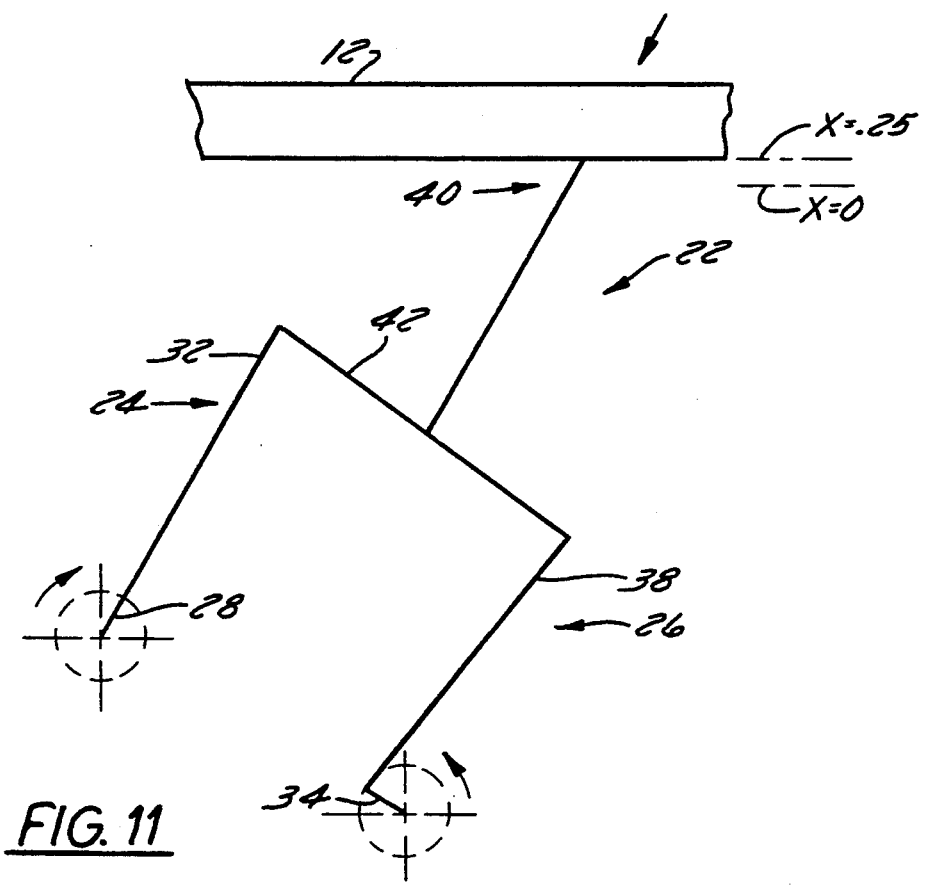
Figure 12:
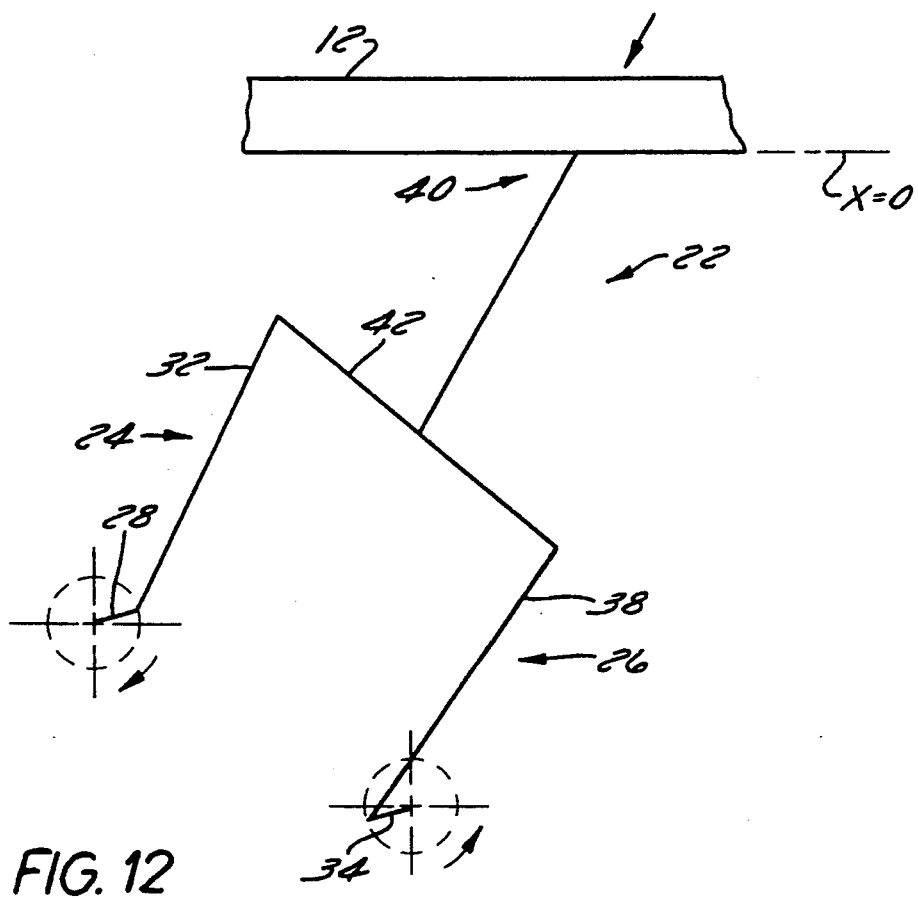
Figure 13:
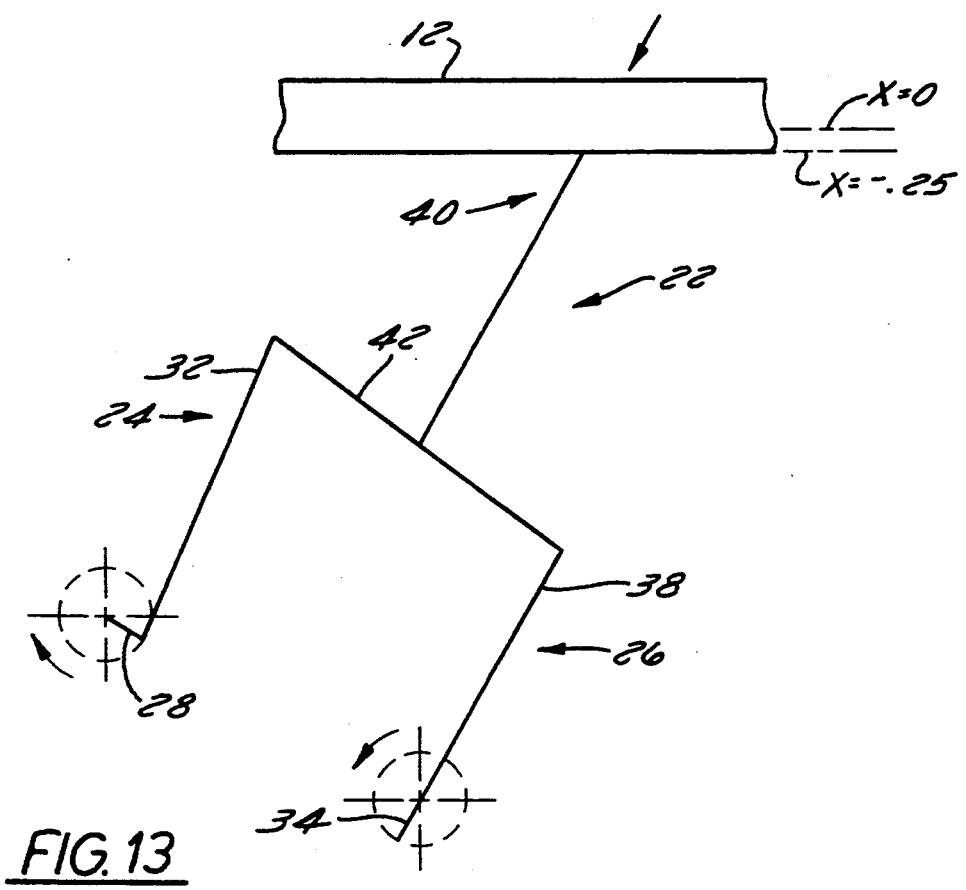
Figure 14:
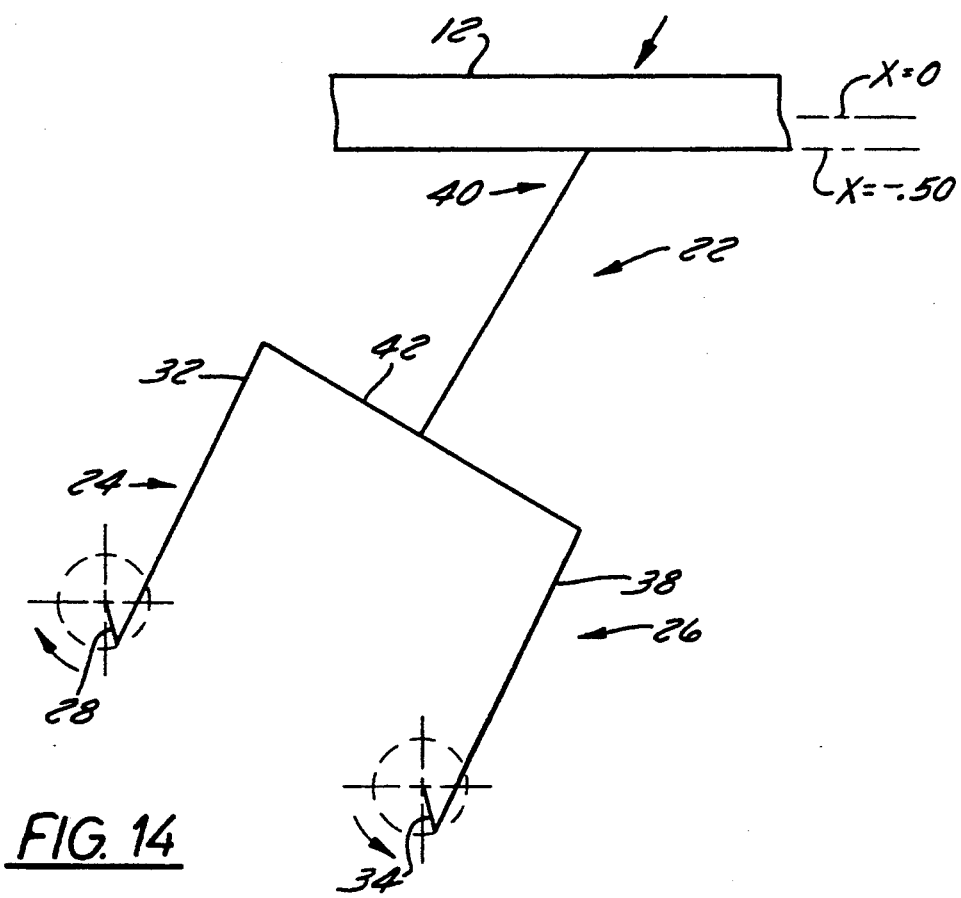
Figure 15:
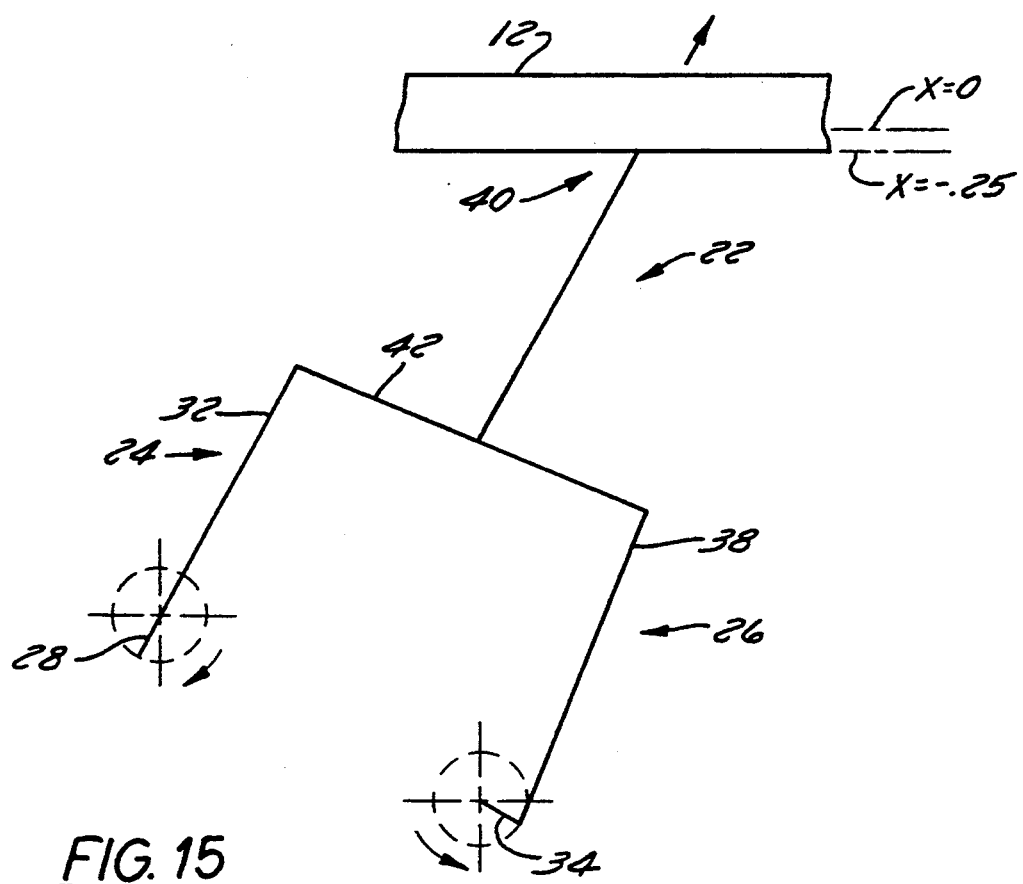

FIGS. 8 through 15, sequentially illustrate the operation of the drive system 22 and its displacement effects on the trough 12 with the crank arm 28 and crank arm 34 in a first rotational position or phase angle "a" relationship (corresponding to a first rotational position of the phase angle adjustment plate 76) as the crank arms 28 and 34 rotate on the axles 30 and 36, respectively. As seen in FIG. 8, at a time equal to zero the crank arm or bell crank 28 of the first crank device 24 is at a first rotational phase angle of 15° to the datum "b" in the third quadrant of rotation (or 195° in the third quadrant), and the crank arm or bell crank 34 of the second crank device 26 is at a first rotational phase angle of 15° to the datum "b" in the first quadrant of rotation. At this time (time equal to zero), the trough 12 is at a resultant displacement "x" of zero as indicated by the phantom displacement datum line x=0. As can be seen in FIG. 9, at a time equal to $\pi/4$ or 45° of rotation from the time equal to zero, the crank arm 28 of the first crank device 24 has rotated clockwise to an angle of 150° in the second quadrant and the crank arm 34 of the second crank device 26 has rotated counter-clockwise to an angle of 60° in the first quadrant. At this time (time equal to $\pi/4$), the trough 12 has moved generally upwardly to a first upward resultant displacement as indicated by the phantom displacement line x=0.25. As can be seen in FIG. 10 at a time equal to $\pi/2$ or 90° of rotation from the time equal to zero, the crank arm 28 of the first crank device 24 has rotated clockwise to an angle of 105° in the second quadrant. At this time (time equal to $\pi/2$), the trough 12 has moved generally upwardly to a maximum upwardly displacement as indicated by the phantom displacement line x=−0.50. As can be seen in FIG. 11 at a time equal to ¾π or 135° of rotation from the time equal to zero, the crank arm 28 of the first crank device 24 has rotated clockwise to an angle of 60° in the first quadrant and the crank arm 34 of the second crank device 26 has rotated counter-clockwise to an angle of 150° in the second quadrant. At this time (time equal to ¾π), the trough 12 has moved back generally downwardly to the first upward resultant displacement as indicated by the phantom displacement line x=0.25. As can be seen in FIG. 12, at a time equal to π or 180° of rotation from the time equal to zero, the crank arm 28 of the first crank device 24 has rotated clockwise to an angle of 15° in the first quadrant and the crank arm 34 of the second crank device 26 has rotated counter-clockwise to an angle of 195° in the third quadrant. At this time (time equal to π), the trough 12 has moved back generally downwardly to the resultant displacement datum x=0. As can be seen in FIG. 13, at a time equal to 5/4π or 225° of rotation from the time equal to zero, the crank arm 28 of the first crank device 24 has rotated clockwise to an angle of 330° in the fourth quadrant and the crank arm 34 of the second crank device 26 has rotated counter-clockwise to an angle of 240° in the third quadrant. At this time (time equal to 5/4π), the trough 12 has moved generally downwardly to a first downward resultant displacement line x=0.25. As can be seen in FIG. 14, at a time equal to 3/2π or 270° of rotation from the time equal to zero, the crank arm 28 of the first crank device 24 has rotated clockwise to an angle of 285° in the fourth quadrant and the crank arm 34 of the second crank device 26 has rotated counter-clockwise to an angle of 285° in the fourth quadrant. At this time (time equal to 3/2π), the trough 12 has moved downwardly to a maximum resultant downward displacement as indicated by the phantom displacement line x=−0.50. As can be seen in FIG. 15, at a time equal to 1¾π or 315° of rotation from the time equal to zero, the crank arm 28 of the first crank device 24 has rotated clockwise to an angle of 240° in the third quadrant and the crank arm 34 of the second crank device 26 has rotated counter-clockwise to an angle of 330° in the fourth quadrant. At this time (time equal to 1¾π), the trough 12 has moved back generally upwardly to the first downward resultant displacement as indicated by the phantom displacement line x=−0.25.

Comparing FIGS. 4 through 7 with FIGS. 8 through 15, it can be seen that when the crank arm 28 of the first crank device 24 and the crank arm 34 of the second crank device 26 have been moved by the phase angle adjustment means 74 from the initial rotational position or phase angle relationship "a" (FIGS. 4–7) to the first rotational position or phase angle relationship "a" (FIGS. 8–15) that the stroke or displacement imparted to the trough 12 is reduced.

Figure 17:
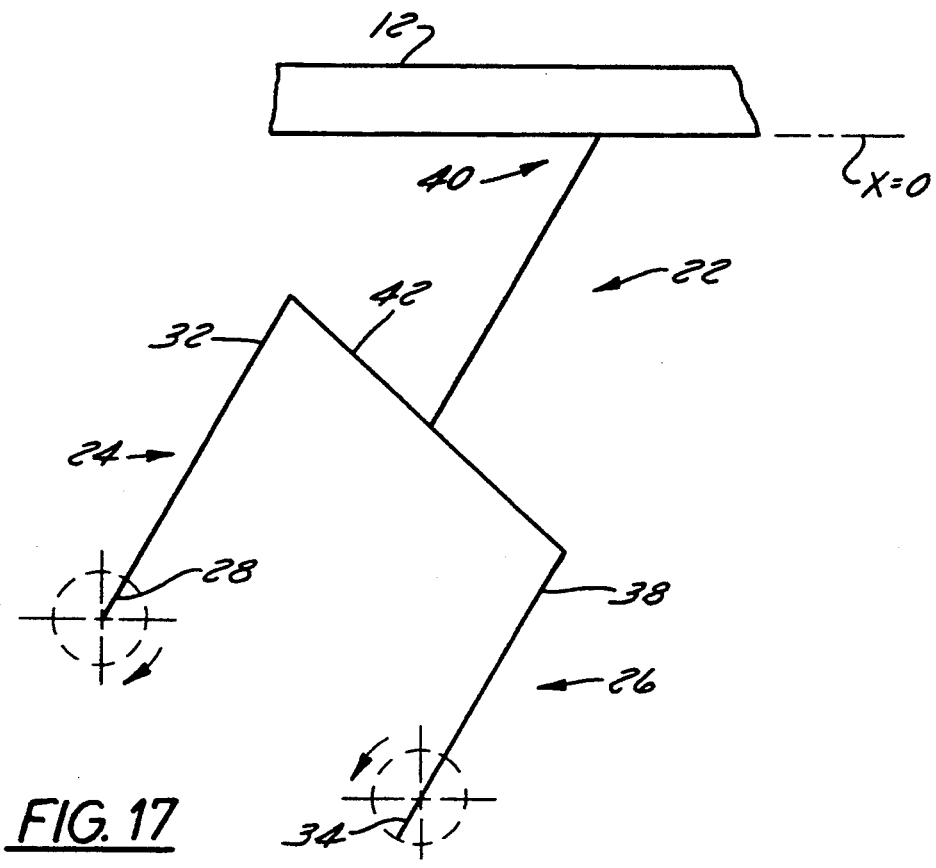
FIG. 17-19 schematically sequentially illustrate the operation of the drive system as it functions in the adjusted second operative position.
Figure 18:
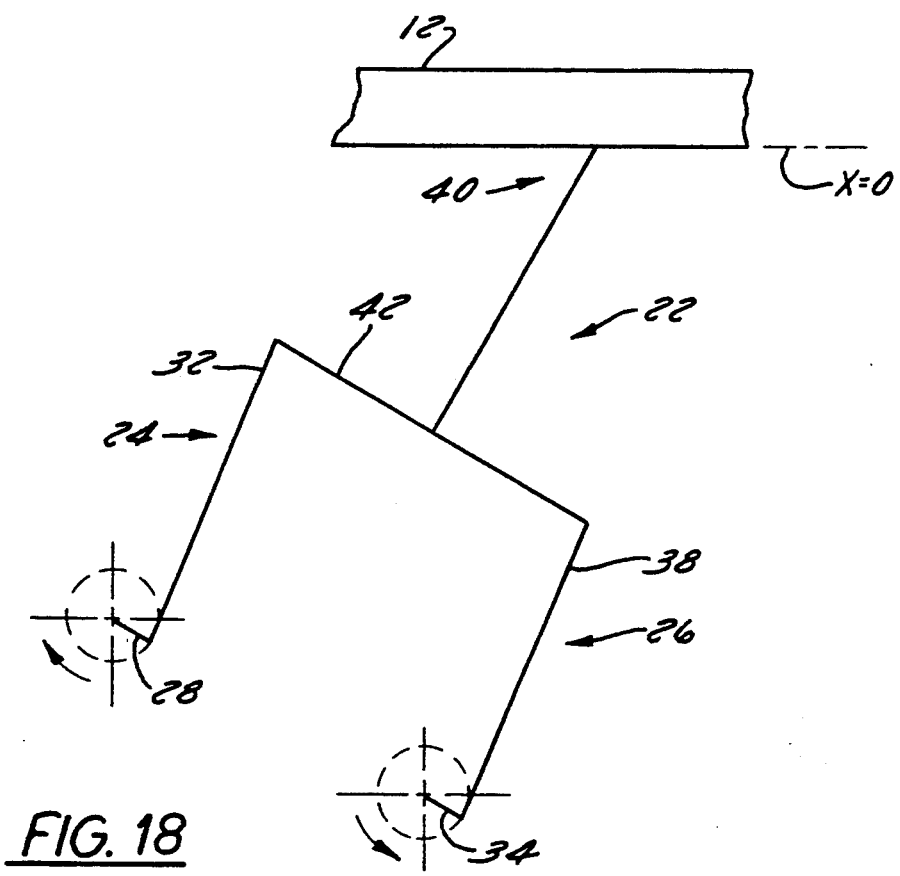
Figure 19:
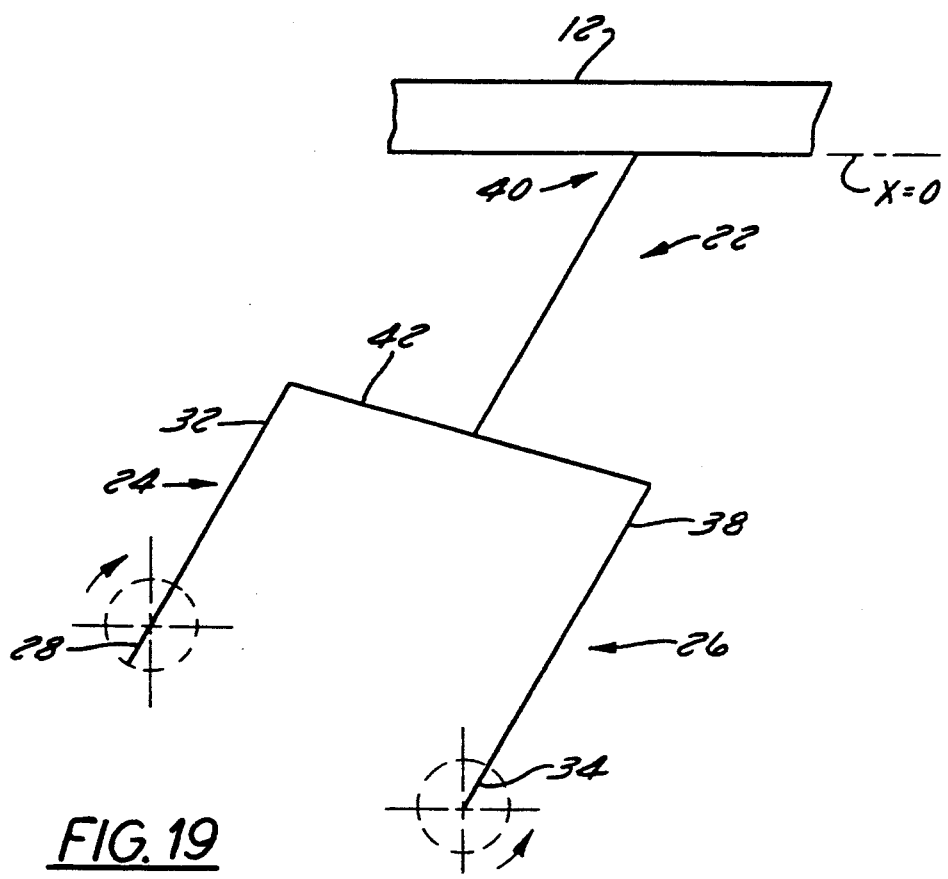

FIGS. 16 through 19 sequentially illustrate the operation of the drive system 22 and its displacement effects on the trough 12 with the crank arm 28 and the crank arm 34 in a second rotational position or phase angle "a" relationship (corresponding to a second rotational position of the phase angle adjustment plate 76) as the crank arms 28 and 34 rotate on the axles 30 and 36, respectively. As seen in FIG. 16, at a time equal to zero, the crank arm or bell crank 28 of the first crank device 24 in a second rotational phase angle of 30° to the datum "b" in the second quadrant of rotation (or 150° in the second quadrant), and the second crank arm or bell crank 28 of the second crank device 26 is at a second rotational phase angle of 30° to the datum "b" in the second quadrant (or 150° in the second quadrant). At this time (time equal to zero), the trough 12 is at a resultant displacement "x" of zero as indicated by the phantom displacement datum line x=0. As can be seen in FIG. 17, at a time equal to π/2 or 90° of rotation from the time equal to zero, the crank arm 28 of the first crank device 24 has rotated clockwise to an angle of 60° in the first quadrant and the crank arm 34 of the second crank device 26 has rotated counter-clockwise to an angle of 240° in the third quadrant. At this time (time equal to π/2), the trough 12 has not moved from the datum line x=0 and, therefore, the trough 12 has not been displaced. As can be seen in FIG. 18, at a time equal to π or 180° of rotation from the time equal to zero, the crank arm 28 of the first crank device 24 has rotated clockwise to an angle of 330° in the fourth quadrant and the crank arm 34 of the second crank device 26 has rotated counter-clockwise to an angle of 330° in the fourth quadrant. At this time (time equal to π), the trough 12 has not moved from the datum line x=0 and, therefore, the trough 12 has not been displaced. As can be seen in FIG. 19, at a time equal to 3/2π or 270° of rotation from the time equal to zero, the crank arm 28 of the first crank device 24 has rotated clockwise to an angle of 240° in the third quadrant and the crank arm 34 of the second crank device 26 has rotated counter-clockwise to an angle of 60° in the first quadrant. At this time (time equal to 3/2π), the trough 12 has not moved from the datum line x=0 and, therefore, the trough 12 has not been displaced.

Comparing FIGS. 4 through 7 with FIGS. 16 through 19, it can be seen that when the crank arm 28 of the first crank device 24 and the crank arm 34 of the second crank device 26 have been moved by the phase angle adjustment means 74 from the initial rotational position or phase angle relationship "a" (FIGS. 4–7) to the second rotational position or phase angle relationship "a" (FIGS. 16–19) that the stroke or displacement imparted to the trough 12 is zero.

Now comparing FIGS. 4 through 7, FIGS. 8 through 15, and FIGS. 16 through 19, it can be visualized that by moving the phase angle adjustment means 74 the stroke or displacement of the trough 12 can be infinitely varied between a maximum (FIGS. 4–7) and a minimum or zero (FIGS. 16–19).

The amount by which the relative phase angles "a" of the crank arm 28 and the crank arm 34 change as the phase angle adjustment plate 76 is moved, either clockwise or counter-clockwise, as described above, through any given angle of displacement from the initial position is a function of the belt path geometry defined by the drive sheaves 64 and 66, and the idler sheaves 78 and 80. The various design features of the phase angle adjustment means 74 which affect the belt path geometry are, for example, the relative sizes of the drive sheaves 64 and 66, and the idler sheaves 78 and 80, and the distance between the sheaves 64, 66, 78, 80 when the phase angle adjustment plate 76 has been pivoted counter-clockwise from the initial position of FIG. 4, the distance between the driven belt tangent point 1p on the first sheave 64 and the driven belt tangent point 2p on the idler sheave 78 is shortened. The effective shortening of the portion of the driven belt 72 between the driven belt tangent points 1p and 2p results in a change of the relative phase angles "a" of the crank arm 28 and crank arm 34 in one angular direction. Likewise, when the phase angle adjustment plate 76 has been pivoted clockwise, the distance between the driven belt tangent point 1p on the first sheave 64 and the driven belt tangent point 2p on the idler sheave 78 is lengthened. The effective lengthening of the portion of the driven belt 72 between the driven belt tangent points 1p and 2p result in a change of the crank arm 28 and the crank arm 34 in the other angular direction.

The foregoing detailed description is given primarily for clearness of understanding and no unnecessary limitations are to be understood therefrom for modifications will become obvious to those skilled in the art upon reading this disclosure and may be made without departing from the scope of the inventions or scope of the appended claims.

I claim:

1. A vibratory conveyor comprising
   (a) a framework;
   (b) a conveyor trough;
   (c) a vibratory drive system for imparting a resultant vibrating displacement to the trough, said system comprising
      (i) a first crank device mounted on the framework,
      (ii) a second crank device mounted on the framework,
      (iii) a linkage assembly interconnecting said first and second crank devices,
      (iv) a pivot drive connection element connecting the linkage assembly to said trough, and
      (v) a driving device interconnecting the first and second crank devices so as to cause the said first and second crank devices to rotate in opposite directions; and
   (d) a displacement adjustment assembly operatively associated with the vibratory drive system for relatively changing the magnitude of the displacement imparted to the trough between a minimum and maximum, said displacement adjustment assembly being operatively associated with said driving element.

2. The vibratory conveyor of claim 1 wherein the displacement adjustment assembly comprises a phase angle adjustment means for selectively changing the relative phase angles between the first crank device and the second crank device thereby selectively changing the magnitude of the resultant displacement imparted to the linkage assembly by said first and second crank devices and, therefore, to the conveying through between a minimum and a maximum.

3. The vibratory conveyor of claim 2, wherein said driving device comprises
   (a) a first sheave operatively associated with the first crank device for rotation therewith;
   (b) a second sheave operatively associated with the second crank device for rotation therewith; and
   (c) a driven belt interconnecting the first sheave and the second sheave with the inside surface of the driven belt in driving contact with the first sheave and the outside surface of the driven belt in driving contact with the second sheave.

4. The vibratory conveyor of claim 3, wherein the phase angle adjustment device comprises:
   a. a first idler sheave having an axis of rotation parallel to the axis of rotation of the second sheave;
   b. a second idler sheave having an axis of rotation parallel to the axis of rotation of the second sheave, the axis of rotation of the first idler sheave and axis of rotation of the second idler sheave being located to either side of the axis of rotation of the second sheave;
   c. the driven belt interconnecting the first idler sheave and second idler sheave with the inside surface of the driven belt in contact with the first and second idler sheaves; and,
   d. means for selectively either increasing or decreasing the length of the portion of the driven belt between the first idler sheave and the first sheave.

5. The vibratory conveyor of claim 4, wherein the means for selectively changing the length of the driven belt of the phase angle adjustment device comprises:
   a. a phase angle adjustment plate mounted for selective movement through an arc concentric with the axis of rotation of the second sheave of the interconnecting means;
   b. the first idler sheave mounted to the phase angle adjustment plate for rotation; and,
   c. the second idler sheave mounted to the phase angle adjustment plate for rotation.

6. The vibratory conveyor of claim 5, further comprising phase angle adjustment plate moving means for selectively moving the phase angle adjustment plate in a clockwise arcuate direction and in a counter-clockwise arcuate direction.

7. A vibratory conveyor comprising
   (a) a framework;
   (b) a conveyor trough;
   (c) a vibratory drive system for imparting a resultant vibrating displacement to the trough, said system comprising
      (i) a first crank device mounted on said framework,
      (ii) a second crank device spaced from said first crank device and mounted on said framework,
      (iii) a linkage assembly interconnecting said first and second crank devices,
      (iv) pivot drive connection element connecting the linkage assembly to said trough,
      (v) a driving element interconnecting the first and second crank devices; and
   (d) a displacement adjustment assembly operatively associated with the vibratory drive system for relatively changing the magnitude of the displacement imparted to the trough between a minimum and a maximum, said displacement adjustment assembly including a phase angle adjustment device for selectively changing the relative phase angle between said first and second crank devices which selectively changes the magnitude of the resultant displacement imparted to said linkage assembly by said first and second crank devices and, therefore, to the conveyor trough between a minimum and an maximum.

8. A vibratory conveyor comprising
   (a) a conveyor trough;
   (b) a first rotating device;
   (c) a second rotating device spaced from said first element;
   (d) a linkage assembly coupled to said trough and to each of said first and second devices so as to impart a displacement to said trough proportional to a relative phase angle defined by the respective locations of the couplings of said first and second devices to said linkage assembly;
   (e) a driving assembly for rotating said first and second devices; and (f) a phase angle adjusting assembly coupled to said first and second rotatable devices for selectively adjusting the relative phase angle.

9. The vibratory conveyor of claim 8 in which said first and second rotating devices are respective first and second crank assemblies with respective first and second crank arms each coupled to said linkage assembly, said relative phase angle being defined by the respective locations of said first and second crank arms.

10. The vibratory conveyor of claim 9 in which said first crank assembly has a first axle transverse to the conveying direction of said trough and said second crank assembly has a second axle transverse to the conveying direction of said trough.

11. The vibratory conveyor of claim 9 in which said linkage assembly is pivotally connected to said trough.

12. A vibratory conveyor comprising
(a) a framework;
(b) a conveyor trough;
(c) a vibratory drive system for imparting a resultant vibrating displacement to the trough, said system comprising
 (i) a first crank device having a first axle transverse to the conveying direction of the trough and rotatably mounted in the framework,
 (ii) a second crank device having a second axle transverse to the conveying direction of the trough and rotatably mounted in the framework,
 (iii) a linkage assembly interconnecting said first and second crank devices,
 (iv) a pivot drive connection element connecting the linkage assembly to said trough, and
 (v) a driving element interconnecting the first and second crank devices; and
(d) a displacement adjustment device operatively associated with the vibratory drive system for relatively changing the magnitude of the displacement imparted to the trough between a minimum and maximum, said displacement device being operatively associated with said driving element.

13. The vibratory drive conveyor of claim 12 in which
the first crank device further comprises a first crank arm attached to a proximal end to said first axle and a first connecting rod attached at a first one of its ends to distal end of the crank arm,
the second crank device comprises a second crank arm attached at a proximal end to said second axle and a second connecting rod attached at a first one of its ends to the distal end of the second crank device, and
said linkage assembly being pivotally attached to the second ends of the first and second connecting rods.

* * * * *